United States Patent
Sakya et al.

(10) Patent No.: US 11,140,068 B2
(45) Date of Patent: Oct. 5, 2021

(54) EDGE NETWORKING DEVICES AND SYSTEMS FOR IDENTIFYING A SOFTWARE APPLICATION

(71) Applicant: Edgewater Networks, Inc., San Jose, CA (US)

(72) Inventors: Rumus M. Sakya, Livermore, CA (US); Avinash V. Shenoi, Pune (IN); Pooja A. Joshi, Pune (IN)

(73) Assignee: Edgewater Networks, Inc., San Jose, CA (US)

( * ) Notice: Subject to any disclaimer, the term of this patent is extended or adjusted under 35 U.S.C. 154(b) by 79 days.

(21) Appl. No.: 16/017,523

(22) Filed: Jun. 25, 2018

(65) Prior Publication Data

US 2019/0394117 A1   Dec. 26, 2019

(51) Int. Cl.

| | |
|---|---|
| *H04L 12/751* | (2013.01) |
| *H04L 12/851* | (2013.01) |
| *H04L 12/859* | (2013.01) |
| *H04L 12/927* | (2013.01) |
| *H04L 12/26* | (2006.01) |
| *H04L 12/911* | (2013.01) |

(52) U.S. Cl.
CPC .............. *H04L 45/08* (2013.01); *H04L 43/12* (2013.01); *H04L 47/2475* (2013.01); *H04L 47/2483* (2013.01); *H04L 47/78* (2013.01); *H04L 47/803* (2013.01); *H04L 47/805* (2013.01); *H04L 43/04* (2013.01); *H04L 43/062* (2013.01); *H04L 43/08* (2013.01); *H04L 43/0894* (2013.01)

(58) Field of Classification Search
CPC ......... H04L 45/08; H04L 47/78; H04L 43/12; H04L 47/2483; H04L 47/2475; H04L 47/805; H04L 47/803; H04L 43/0894; H04L 43/08; H04L 43/04; H04L 43/062
See application file for complete search history.

(56) References Cited

U.S. PATENT DOCUMENTS

| | | | | |
|---|---|---|---|---|
| 9,094,288 | B1 * | 7/2015 | Nucci | H04L 43/026 |
| 10,536,478 | B2 * | 1/2020 | Kirti | H04L 63/20 |
| 10,855,604 | B2 * | 12/2020 | Tigli | H04L 43/026 |
| 2012/0240185 | A1 * | 9/2012 | Kapoor | H04L 41/0866 726/1 |
| 2013/0194930 | A1 * | 8/2013 | Szabo | H04L 43/026 370/235 |
| 2015/0156086 | A1 * | 6/2015 | Chesla | G06N 5/04 709/224 |
| 2016/0205039 | A1 * | 7/2016 | Akolkar | H04L 41/147 709/226 |
| 2017/0126475 | A1 * | 5/2017 | Mahkonen | H04L 41/0631 |
| 2018/0302410 | A1 * | 10/2018 | Venkataraman | H04L 63/0245 |
| 2018/0324030 | A1 * | 11/2018 | Dang | H04L 41/147 |

(Continued)

*Primary Examiner* — Brian T O Connor

(74) *Attorney, Agent, or Firm* — Brooks, Cameron & Huebsch, PLLC

(57) ABSTRACT

Edge networking router devices and systems for identifying a software application are described herein. One or more embodiments include an edge networking router device for identifying a software application comprising a packet collector to receive packet data in the edge networking router device and an artificial intelligence (AI) model configured to process the packet data received by the packet collector to identify the software application, wherein the artificial intelligence (AI) model is trained using a cloud entity and received from the cloud entity.

19 Claims, 2 Drawing Sheets

(56) References Cited

U.S. PATENT DOCUMENTS

| | | | |
|---|---|---|---|
| 2019/0082286 A1* | 3/2019 | Tata | H04W 4/38 |
| 2019/0141067 A1* | 5/2019 | Rodriguez | G06N 3/08 |
| 2019/0296978 A1* | 9/2019 | Seshadri | H04L 63/20 |
| 2020/0005187 A1* | 1/2020 | Bendre | G06N 20/00 |
| 2020/0044921 A1* | 2/2020 | Srinivas | H04L 41/0816 |
| 2020/0169509 A1* | 5/2020 | Tigli | H04L 41/147 |
| 2021/0006471 A1* | 1/2021 | Kvasyuk | |

* cited by examiner

EDGE NETWORKING DEVICES AND SYSTEMS FOR IDENTIFYING A SOFTWARE APPLICATION

TECHNICAL FIELD

The present disclosure relates to edge networking router devices and systems for identifying a software application.

BACKGROUND

There are many software applications used at home, in the workplace, and in public that can be accessed by users via a network connection. Such applications may be used for work, entertainment, communication, or education. For example, Salesforce and GoogleDocs could be identified as work applications and Netflix, Youtube, and Minecraft could be identified as entertainment applications.

Identifying software applications allows an administrator or a user to prioritize applications when network resources or bandwidth are limited, limit or restrict the use of unproductive or inappropriate applications, direct particular application traffic over a particular network or link for increased or optimal quality of service (QoS), and/or restrict execution of particular applications for security reasons to prevent theft of intellectual property (IP), content, or privacy.

Many organizations use deep packet inspection (DPI) to identify applications. All traffic packets are processed through a hardware or software module that inspects the packets to identify the applications.

DPI can be accurate but costly because DPI requires dedicated hardware. For example, DPI can require a central processing unit and/or memory. DPI can also affect the throughput of the system because all traffic must pass through the packet inspection process.

In the case of encrypted traffic, DPI cannot be utilized transparently without being able to successfully decrypt the original traffic. For example, for a DPI to be used over an end-to-end encrypted channel, the encrypted channel would need to be broken into two channels, where the traffic is decrypted in between, processed, re-encrypted, and then re-transmitted. Further, the system would need to know the specific decryption algorithms to decrypt each of potentially many encryption types.

DETAILED DESCRIPTION

Figure 1:
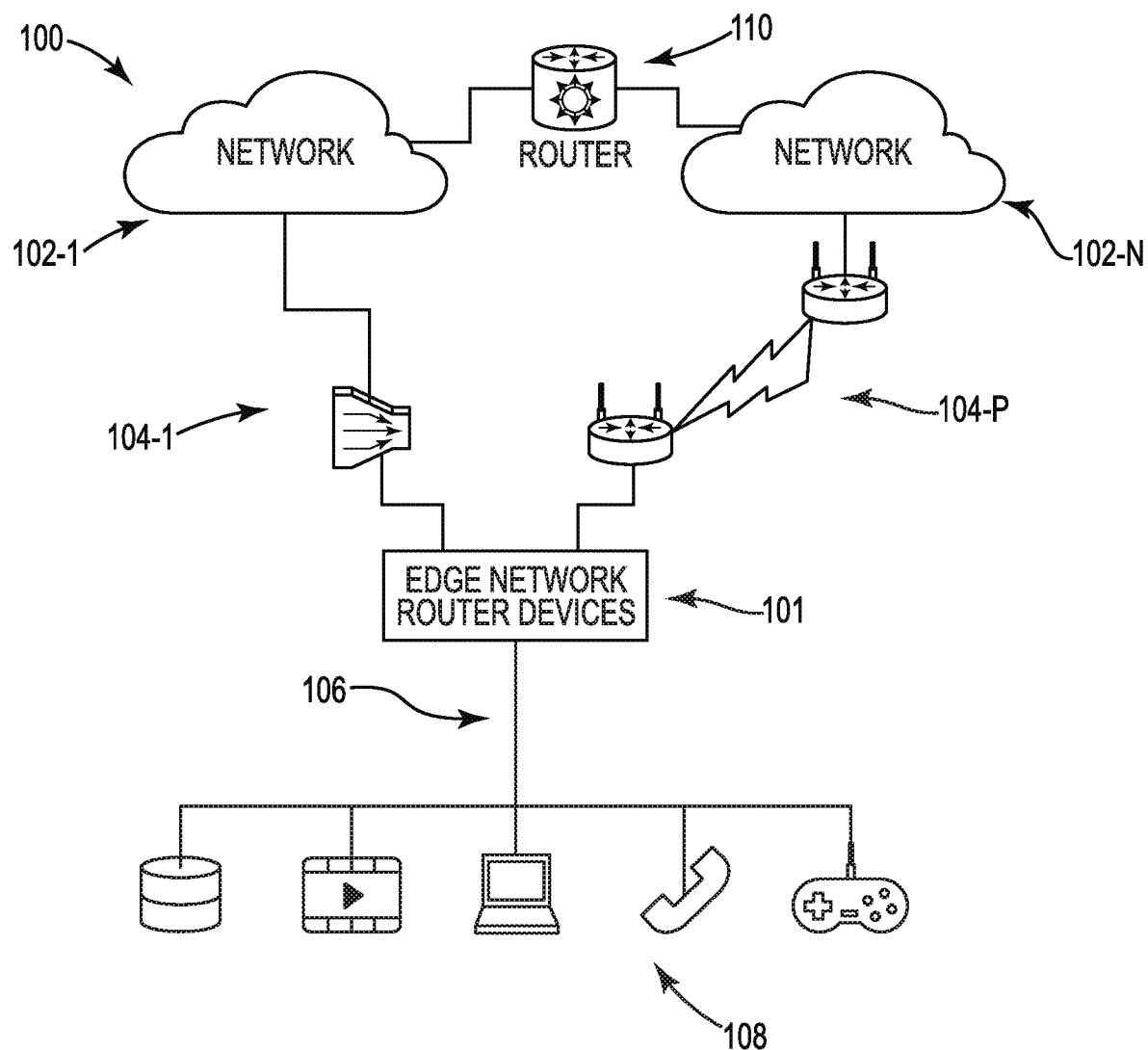
FIG. 1 illustrates an example of a system including edge devices according to one or more embodiments of the present disclosure.

In the embodiments of the present disclosure, a voice over Internet protocol (VoIP) device and/or edge device can be used for identifying a software application. The device can include a packet collector and an artificial intelligence (AI) model. The packet collector can be utilized to receive packet data.

The AI model can be configured to process the packet data received by the packet collector to identify the software application. The AI model can be trained using an entity located in a cloud environment.

In some embodiments, the packet collector can send the packet data to the cloud entity to train a new version of the AI model. The AI model or a new version thereof can be received by the device from the cloud entity in response to the AI model completing training. The AI model can be updated according to a schedule, for example.

The edge networking device can be a router. For example, the edge networking router device can be a thin edge networking device. The AI model of the edge networking router device can generate a command in response to identifying the software application. The command can prioritize the software application and, in response, the software application can receive network resources and/or receive increased network bandwidth.

In some embodiments, the command can restrict or limit network resources allotted to an entertainment software application, if it is desired by an employer to reduce or eliminate use of resources for entertainment during working hours. For example, the command can limit network bandwidth allocated to a particular software application or type of application, such as entertainment applications. In some examples, the command can direct the software application to a particular network. The particular network can provide increased or decreased quality of service (QoS).

A high QoS, for example, can result in an increased bandwidth, link quality, and/or number of links allocated to the software application. The link quality can be determined by end-to-end payload traversal through the Internet, for example. In the case of Skype, a voice over Internet protocol application (VoIP), the increased bandwidth, link quality, and/or number of links can provide clearer voice quality, less delay, and/or less echo, for example.

The AI model can calculate a probability that the AI model correctly identified the software application or type of application. In some examples, the AI model and the prediction can be used to calculate a confidence score for the prediction. For example, a confidence score of 99.9% can be interpreted as the AI model being 99.9% positive that the software application was correctly identified.

In some examples, the AI model can assign the software application to one or more categories. For example, the software application can be identified as a work, entertainment, communication, or education application. For example, GoogleDocs and Salesfoce can be categorized under work applications and when network traffic is identified as being from GoogleDocs or Salesforce, the AI model classifies the software application as work.

The network resources allotted to the software application can increase or decrease in response to the one or more categories the AI model assigns the software application to. For example, in a work environment, the work application may receive limited network resources over an entertainment application.

The cloud entity can be an element management server or a device management server. The cloud entity can train the AI model using packet sample data. The packet sample data can be collected from a number of edge devices.

In the following portion of the detailed description, reference is made to the accompanying figures that form a part hereof. The figures show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense. Also, as used herein, "a" or "a number of" something can refer to one or more such things. For example, "a number of operations" can refer to one or more operations.

FIG. 1 illustrates an example of a system including edge networking router devices according to one or more embodiments of the present disclosure. In the embodiment illustrated in FIG. 1, the system 100 includes a number of edge network router devices 101, a number of networks 102-1, 102-N (e.g., WAN networks), a number of network links 104-1, 104-P (wired or wireless), a number of local networks 106, a number of end communication devices that a party may use to communicate with another party over a connection through one of the network links 104-1, 104-P, and a number of intermediary devices 110 that provide a pathway to allow the passing of packets between networks 102-1, 102-N.

The system 100, shown in FIG. 1, includes two network connections (via networks 102-1 and 102-N) that can each be used by a party using one or more end devices 108 to communicate with another party on a network that is communicating through intermediary device 110. The one or more end devices 108 can be, but are not limited to, a computer, a phone, a storage device, videos, gaming systems, and/or other Internet of things (IoT).

As can be seen from the illustration in FIG. 1, the edge networking router device 101 can be connected to one or more links. The one or more links can be connected to one or more networks. For instance, link 104-1 allows connection to network 102-1 and a unique IP address is provided to identify the edge networking router device 101 with respect to that network.

Link 104-P allows connection to network 102-N and a unique IP address (different from that used for network 102-1) is provided to identify the edge networking router device 101 with respect to that network. Additionally, edge networking router device 101 is also connected to a local network (LAN) through link 106 and a unique IP address (different from those used for networks 102-1, 102-N) is provided to identify the edge networking router device 101 with respect to that network.

Figure 2:
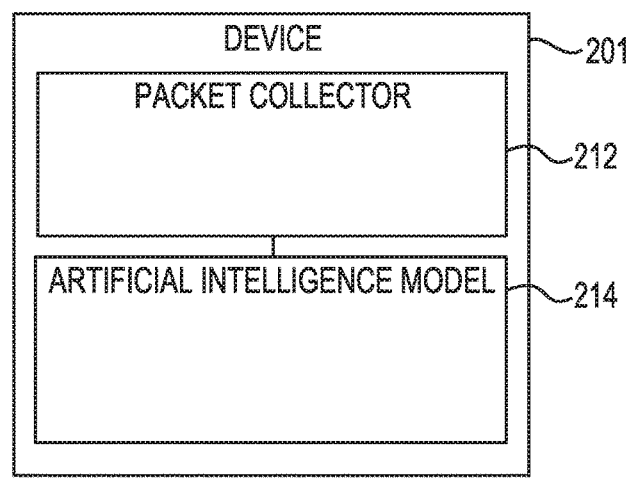
FIG. 2 illustrates an example of a device for identifying an application according to one or more embodiments of the present disclosure.

FIG. 2 illustrates an example of a device for identifying an application according to one or more embodiments of the present disclosure. The device 201 can be for example, an edge networking router device. In some examples, the device 201 can include a packet collector 212 and an artificial intelligence model 214.

The packet collector 212 can receive packet data and the AI model 214 can be configured to process the packet data to identify the software application. The packet data can be traffic from a local area network (LAN) and/or wide area network (WAN). In some examples, the AI model 214 can be trained using a cloud entity.

The AI model 214 can include a list of characteristics to distinguish one application from other applications and can be in the form of a decision tree, for example. Characteristics can include, but are not limited to, source IP, destination IP, source port, destination port, and protocols, for example.

In some embodiments, the packet collector 212 can send the packet data to the cloud entity to train a new version of the AI model 214. The AI model 214 can be received by the device 201 from the cloud entity in response to the AI model 214 completing training.

The AI model 214 can be updated according to a schedule. For example, the device 201 can request an updated AI model 214 from the cloud entity after a particular period of time and/or can request an updated AI model 214 in response to incorrectly identifying a particular number of applications.

The device 201 can be a thin edge networking router device. In some examples, a thin edge networking router device can be utilized in residences or businesses which do not or cannot have costly and high-performance resource-rich components like central processing units and memory.

The AI model 214 of the device 201 can generate a command in response to identifying the software application. The command can prioritize the software application and in response, the software application can receive network resources and/or receive increased network bandwidth.

In some embodiments, the command can restrict or limit network resources allocated to the software application. For example, the command can limit network bandwidth allotted to the software application.

In some examples, the command can direct the software application to a particular network. The particular network can provide increased or decreased quality of service (QoS).

A high QoS, for example, can result in an increased bandwidth allocated to the software application. In the case of Skype, a voice over Internet protocol application, the increased bandwidth can provide clearer voice quality, less delay, and/or less echo, for example.

Figure 3:
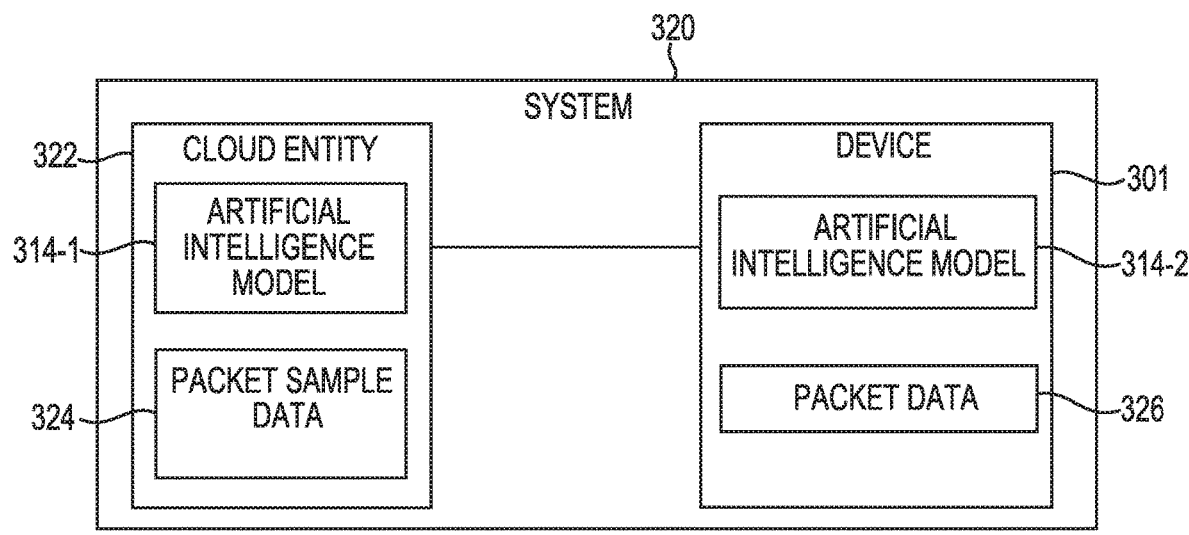
FIG. 3 illustrates an example of a system for identifying an application according to one or more embodiments of the present disclosure.

FIG. 3 illustrates an example of a system for identifying an application according to one or more embodiments of the present disclosure. The system 320 can include a cloud entity 322 and a device 301.

The cloud entity 322 can include an artificial intelligence model 314-1 and packet sample data 324. The device 301 can include an artificial intelligence model 314-2 that is a copy of the artificial intelligence model 314-1 trained by the cloud entity 322.

The device 301 can also include packet data 326. The packet data 326 can be from network traffic collected by the packet collector (e.g., packet collector 212 in FIG. 2).

The AI model 314-2 can calculate a probability that the AI model 314-2 correctly identified the software application. In some examples, the AI model 314-2 and the prediction can be used to calculate a confidence score for the prediction. For example, a confidence score of 99.9% can be interpreted as the AI model 314-2 being 99.9% positive that the software application was correctly identified. In response to the probability reaching a minimum threshold, the device 301 can request a new and/or updated AI model from the cloud entity 322.

In some examples, the AI model 314-2 can assign the software application to one or more categories. For example, the software application can be identified as a work, entertainment, communication, or education application. GoogleDocs and Salesfoce, for example, can be categorized under work applications and when network traffic is identified as being from GoogleDocs or Salesforce, the AI model 314-2 can classify the software application as work.

The network resources allotted to the software application can increase or decrease in response to the one or more categories the AI model 314-2 assigns the software application to. For example, in a work environment, the work application may receive limited network resources over an entertainment application.

The cloud entity 322 can be an element management server or a device management server. The cloud entity 322 can train the AI model 314-1 using packet sample data 324. The packet sample data 324 can be collected from a number of edge devices.

For example, the packet sample data can be collected by a representative edge network device over a period of time. The accuracy of the AI model 314-1 increases as the period of time increases.

In some examples, the packet sample data can be collected from one or a number of randomly selected edge devices at incremental times. For example, sample data can be collected from one or a number of randomly selected edge devices every two weeks.

In some embodiments, an edge device or a number of edge devices can send a particular number of packets for packet sample data to the cloud entity 322. The cloud entity 322 can send the AI model 314-1 as a copy AI model 314-2 to a device once the particular number of packets have been used to create the AI model 314-1. The particular number of packets can depend on the desired accuracy of the AI model 314-1. For example, 200,000 samples can be gathered to predictably classify ninety percent or more of applications.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A thin edge networking router device, coupling one or more network links to one or more end devices, for identifying a software application, comprising:
    a packet collector to receive packet data in the thin edge networking router device; and
    a model configured to:
        process the packet data received by the packet collector to identify the software application, wherein the model is trained using a cloud entity and received from the cloud entity, wherein the model uses a decision tree and includes at least one of a source port or a destination port to identify the software application from another software application; and
        calculate a probability that the model correctly identified the software application, wherein the thin edge networking router device requests a new version of the model from the cloud entity in response to the probability that the model correctly identified the software application reaching a threshold.

2. The device of claim 1, wherein the packet collector sends the packet data to the cloud entity to train the new version of the model.

3. The device of claim 1, wherein the model is received from the cloud entity in response to the model completing training.

4. The device of claim 1, wherein the model is updated according to a schedule.

5. The device of claim 1, wherein the model assigns the software application to one or more categories in response to identifying the software application.

6. A thin edge networking router device, coupling one or more network links to one or more end devices, for identifying a software application, comprising:
    a packet collector to receive packet data; and
    a model configured to:
        process the packet data received by the packet collector to identify the software application, wherein the model is trained using a cloud entity, and wherein the model uses a decision tree and includes at least one of a source port or a destination port to identify the software application from another software application;
        generate a command in response to identifying the software application; and
        calculate a probability that the model correctly identified the software application, wherein the thin edge networking router device requests a new version of the model from the cloud entity in response to the probability that the model correctly identified the software application reaching a threshold.

7. The device of claim 6, wherein the command prioritizes the software application.

8. The device of claim 7, wherein the software application receives network resources in response to the command prioritizing the software application.

9. The device of claim 7, wherein the software application receives one or more of increased network bandwidth, increased link quality, or increased number of links in response to the command prioritizing the software application.

10. The device of claim 6, wherein the command restricts the software application.

11. The device of claim 6, wherein the command limits network bandwidth allocated to the software application.

12. The device of claim 6, wherein the command directs the software application to a particular network.

13. The device of claim 12, wherein increased quality of service (QoS) is provided in the particular network.

14. The device of claim 12, wherein decreased quality of service (QoS) is provided in the particular network.

15. A system for identifying a software application, comprising:
    a cloud entity configured to train a model using packet sample data; and
    a thin edge networking router device, coupling one or more network links to one or more end devices, configured to:

capture packet data;
receive the model to process the packet data to identify the software application, and wherein the model uses a decision tree and includes at least one of a source port or a destination port to identify the software application from another software application; and
calculate a probability that the model correctly identified the software application, wherein the thin edge networking router device requests a new version of the model from the cloud entity in response to the probability that the model correctly identified the software application reaching a threshold.

16. The system of claim 15, wherein the cloud entity is an element management server or device management server.

17. The system of claim 15, wherein the packet sample data is collected from a number of edge devices.

18. The system of claim 15, wherein the model assigns the software application to one or more categories.

19. The system of claim 18, wherein network resources allocated to the software application can increase or decrease in response to the one or more categories the model assigns the software application to.

* * * * *